(12) United States Patent
Schmelz et al.

(10) Patent No.: US 8,172,305 B2
(45) Date of Patent: May 8, 2012

(54) AUTOMOTIVE VEHICLE DOOR

(75) Inventors: Thomas Schmelz, Niesetal (DE); Carsten Huege, Wehretal (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 163 days.

(21) Appl. No.: 12/374,069

(22) PCT Filed: Jul. 19, 2007

(86) PCT No.: PCT/EP2007/006617
§ 371 (c)(1), (2), (4) Date: Jan. 16, 2009

(87) PCT Pub. No.: WO2008/009482
PCT Pub. Date: Jan. 24, 2008

(65) Prior Publication Data
US 2009/0165393 A1 Jul. 2, 2009

(30) Foreign Application Priority Data
Jul. 19, 2006 (DE) .......................... 10 2006 033 902

(51) Int. Cl.
*B60J 5/00* (2006.01)
(52) U.S. Cl. ........................................ 296/146.7; 49/502
(58) Field of Classification Search ............... 296/146.1, 296/146.5, 146.7, 146.11, 37.13, 191, 193.11, 296/193.03; 49/502
See application file for complete search history.

(56) References Cited

U.S. PATENT DOCUMENTS

| | | | | |
|---|---|---|---|---|
| 2,128,260 A * | 8/1938 | Morrison | ........................ | 49/502 |
| 2,566,871 A * | 9/1951 | Bedford et al. | ................. | 49/502 |
| 2,707,320 A * | 5/1955 | Fish | ................................ | 29/416 |
| 5,169,204 A * | 12/1992 | Kelman | ...................... | 296/146.7 |
| 6,062,790 A * | 5/2000 | Huang | ............................ | 411/531 |
| 6,196,606 B1 * | 3/2001 | McGoldrick | .............. | 296/37.13 |
| 6,381,906 B1 * | 5/2002 | Pacella et al. | .................... | 49/502 |
| 6,474,721 B2 * | 11/2002 | Nishikawa et al. | ......... | 296/146.6 |
| 6,669,260 B2 * | 12/2003 | Clark et al. | ................... | 296/37.8 |
| 6,729,073 B2 * | 5/2004 | Nicolai | ............................ | 49/375 |
| 6,779,830 B2 * | 8/2004 | Patberg et al. | ............. | 296/146.6 |
| 6,857,688 B2 * | 2/2005 | Morrison et al. | ........... | 296/146.7 |
| 6,969,107 B2 * | 11/2005 | Omori et al. | ................ | 296/146.6 |
| 7,032,955 B2 * | 4/2006 | Radu et al. | ................. | 296/146.7 |
| 7,111,893 B2 * | 9/2006 | Carter et al. | ................. | 296/146.1 |

(Continued)

FOREIGN PATENT DOCUMENTS
DE 100 48 774 4/2002
(Continued)

*Primary Examiner* — Glenn Dayoan
*Assistant Examiner* — Pinel Romain
(74) *Attorney, Agent, or Firm* — Fay Kaplun & Marcin, LLP

(57) ABSTRACT

An automobile door containing a door frame, a door module for the incorporation of functional supports such as loudspeakers or the like, and a door soft trim for the aesthetically pleasing finish of the door on the inside of the automobile. The door soft trim and the door module have corresponding catching elements for the attachment of the door soft trim and door module in a predetermined configuration aligned with each other, and with the door module and the door soft trim containing corresponding recesses that are arranged flush to one another with the engagement of the aforementioned catching elements for the incorporation of one of the fixing elements that is to be connected to the door frame. The automobile door presents a stabile and easy to produce automobile door that satisfies the highest standards in manufacturing tolerances.

18 Claims, 3 Drawing Sheets

U.S. PATENT DOCUMENTS

| | | | |
|---|---|---|---|
| 7,111,894 B2 * | 9/2006 | Kora et al. | 296/146.1 |
| 7,441,374 B2 * | 10/2008 | Syed et al. | 49/502 |
| 7,607,716 B2 * | 10/2009 | Buchta et al. | 296/146.6 |
| 7,757,438 B2 * | 7/2010 | Syed et al. | 49/502 |
| 2005/0017538 A1 * | 1/2005 | Omori et al. | 296/146.6 |
| 2005/0206192 A1 * | 9/2005 | Dry | 296/146.7 |
| 2006/0082187 A1 | 4/2006 | Hernandez et al. | |
| 2006/0197356 A1 * | 9/2006 | Catron et al. | 296/146.7 |
| 2006/0283091 A1 * | 12/2006 | Papi et al. | 49/502 |
| 2007/0267889 A1 * | 11/2007 | Flendrig et al. | 296/146.6 |
| 2008/0315620 A1 * | 12/2008 | Campbell et al. | 296/146.7 |
| 2009/0008959 A1 * | 1/2009 | Rehn | 296/146.7 |

FOREIGN PATENT DOCUMENTS

| | | |
|---|---|---|
| DE | 201 21 126 | 5/2002 |
| DE | 10 2004 050075 | 4/2006 |
| DE | 20 2005 013298 | 12/2006 |
| EP | 1 798 083 | 6/2007 |

* cited by examiner

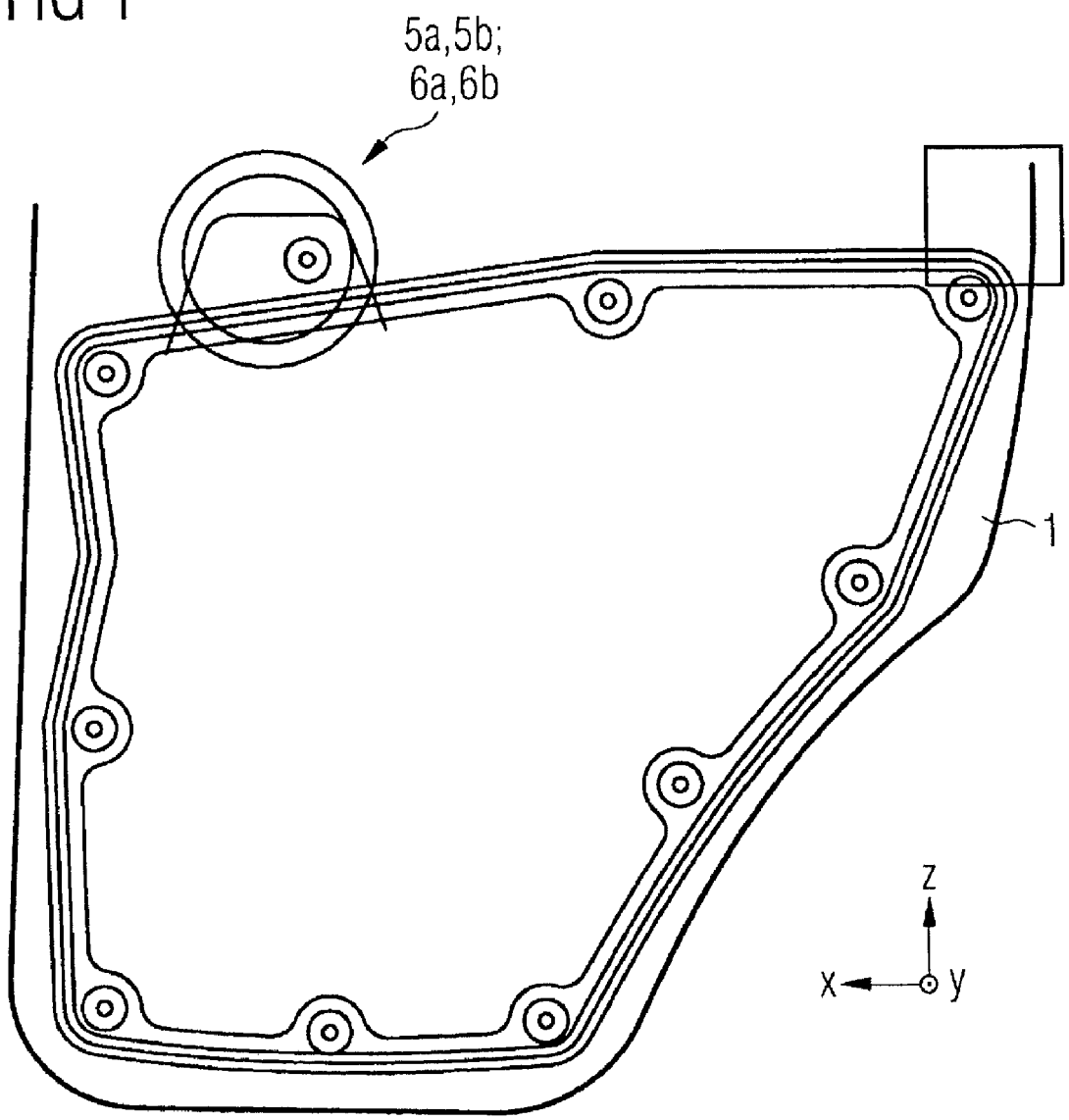

Schnittebene A siehe Fig. 3b

AUTOMOTIVE VEHICLE DOOR

The invention relates to an automotive vehicle door according to claim 18.

FIELD OF INVENTION

The present invention relates to an automotive vehicle door.

BACKGROUND INFORMATION

Modern automotive vehicle doors normally comprise a door frame (normally of a multilayer door sheet construction) and also, on the inside of this door frame, a door module for receiving elements such as loudspeakers etc. Finally, for the aesthetic finish towards the interior of an automotive vehicle, a door covering is placed on the door sheet or the door module.

Despite the requirements of lightweight construction, it is important that the door covering meets the highest demands aesthetically and in particular that the assembly tolerances for the door sheet are kept small. The assembly is hereby intended nevertheless still to be simple. It is important also that a door handle which is accommodated for example in the door covering is as stable as possible despite the lightweight construction.

It is known to clip door coverings vertically on a door frame or a module by means of catching elements. In the case of inaccurate positioning of the elements relative to each other, the assembly can however have a very complex configuration.

The object therefore underlying the present invention is to produce an automotive vehicle door which has a lightweight construction and is still stable and nevertheless fulfils the highest requirements for tolerances with a simple assembly. This object is achieved by an automotive vehicle door according to claim 18.

This is an automotive vehicle door containing
a door frame,
a door module for receiving function providers, such as loudspeakers or the like, and also
a door covering for the aesthetic finish of the door towards the automotive vehicle interior, wherein
door covering and door module have corresponding catching elements for retaining door covering and door module in a predetermined arrangement relative to each other and
door module and also door covering contain corresponding recesses which are disposed aligned relative to each other upon engagement of the above-mentioned catching elements for receiving an attachment member to be connected to the door frame.

It is hereby important that door covering and door module have catching elements which correspond to each other and retain the door covering with respect to the door module. As a result, both are retained in a predetermined arrangement relative to each other.

However, it is then still important that the door module and also the door covering are aligned as desired relative to the door frame in order also to meet the highest tolerance requirements. In addition, a secure hold of the door covering or of the door module on the door frame is of course important. For this purpose, door module and also door covering have corresponding recesses which are disposed aligned relative to each other upon engagement of the above-mentioned catching elements. In this position, this aligned opening serves for receiving an attachment member which attaches door module or door covering to the door frame. As a result, high stability is achieved, in particular for door handle levers which are to be disposed in the vicinity of the attachment member and are subjected to a high mechanical load.

The invention is summarised again in slightly different words subsequently.

The present invention also relates to a "locator"(positioner/attachment) with which a plurality of functions are fulfilled at the same time:
referencing the door covering on the door module,
connecting the complete "Inner Release Handle" region (door handle inside) to the inner sheet of the door in order to keep deformation low during actuation,
to guarantee that the door covering can only be screwed on if it is in the correct position.

A plastic material shell is moulded preferably on the door module, the door covering is referenced on this shell. The shell is hence a so-called "four-way locator" on the door module. The assembly is effected for example via a ramp which is disposed on the door module, the door covering is pushed over this ramp, only when the locator hole corresponds with the collar of the shell (locator), does the door covering snap into the correct position. The door covering can then be screwed to the door module. Screwing together is effected for example directly into the door inner sheet. Before the door covering is snapped into the correct position, it is preferably impossible to screw the screw through the door covering and through the shell into the inner sheet. This type of self-location is also termed "poke-yoke". This poke-yoke function was able to be achieved by the tolerance coordination. If the door covering is still located on the ramp, it is preferably impossible to screw it together since the screw length is preferably too short to find the thread of the preferable weld nut in the sheet.

The following advantages can therefore be achieved with the invention:
the inner release handle region was able to be screwed directly in the centre, therefore very high strength,
the inner release handle region was able to be referenced directly in the middle, lower tolerances of the inner release handle region are consequently achieved;
poke-yoke function, screwing together is only possible when the four-way locator is completely in the correct position, saving in costs and savings in constructional space,
production of a safety function against incorrect screwing together.

Advantageous developments of the present invention are described in the following.

One advantageous development provides that the door frame can be constructed as frame structure comprising support spars which is provided with cover plates or cover sheets. Alternatively, it is also possible (as generally the case) to provide here a multilayer door sheet construction as a structural composite with inner and outer sheet.

The door module can be made completely of plastic material or completely of metal, however also hybrids are possible. Preferably, the door module has an essentially plate-shaped configuration, the door module covering the interior of the door frame partially or essentially over the entire surface. One advantage of an entire surface covering is water-impermeability so that no moisture can penetrate into the door covering or the automotive vehicle interior.

The door covering preferably covers the door module and/or the door frame over the entire surface. The door covering can hereby have a one-part or multipart configuration. The door covering can be formed from polymer plastic materials or from wood fibre moulded materials. A textile or leather lining is possibly provided, preferably a recess is also provided for a door handle module (inner release handle module).

An advantageous development provides that the attachment member in the end assembly state is guided at least partially through the corresponding recesses and/or corresponding catching elements. It is hereby an advantage that the entire locator can have a relatively small construction since both the catching elements and the recesses (which receive the attachment member in an aligned manner according to the invention) are combined in the smallest space.

A further advantageous development provides that the corresponding recesses in the engaged and aligned state have a smaller total hole depth than in the unengaged state. As a result, it becomes possible that the attachment member can be engaged with for example the door frame only at a low total hole depth. It is hence ensured that the actual attachment can be effected only with exactly correct positioning. This means that the total hole depth in the engaged and aligned state of the catching elements is so small that, by means of the attachment member, door covering and door module can only then be fixed to the door frame. This fixing can be effected for example by a nut which is fitted on the door inner sheet (preferably on the side orientated away from the interior of the automotive vehicle).

In order to ensure that the total hole depth in the engaged and unengaged state respectively is different, it can be provided that the corresponding recesses have regions which are complementary relative to each other and engage into each other in a form fit (but only in the engaged state). A further advantageous development provides that the corresponding catching elements are configured as first and second catching element, at least one of these catching elements being an elastically rear-engaging element which engages in a corresponding opening. Constructionally, this can be easily achieved if the relevant parts of the door covering or of the door module are made of plastic material. In this case, corresponding tongues or springs can be recessed, which are mounted resiliently relative to the respective basic body. The elastically rear-engaging element itself can hereby contain a recess for guiding through the attachment member or also be disposed adjacently thereto.

A further advantageous development provides that the catching elements for engagement one in the other are displaceable essentially in the direction perpendicular to the surface plane of the door module or in the direction of the surface plane of the door module. It is possible hereby in particular to choose this displacement direction in the direction of gravity (normally termed "negative Z-direction" in the automobile industry). As a result, an engagement itself is undertaken by gravity, the end positioning is also effected by a corresponding end limit stop.

The attachment member is preferably configured as a screw, rivet, nail or the like.

In addition to the attachment described here as a matter of priority, preferably at least one further "locator" can be provided. This can be for example a two-way locator which is disposed in the centre of the surface of the door module and is fitted in the region of the armrest since here the force transmission is also high.

It is particularly advantageous that the catching elements according to the invention have guides in the vicinity thereof in order that secure engagement is possible. These can be lateral walls (the walls block a movement perpendicular to the direction of guidance), in addition a corresponding end limit stop can preferably be provided.

BRIEF DESCRIPTION OF DRAWINGS

The invention is now described with reference to the following Figures. There are shown:

FIG. 1 a stylised plan view of an automotive vehicle door according to the invention, FIG. 2a a perspective view of corresponding catching elements or recesses, FIG. 2b a section according to section plane A from FIG. 2a and also FIG. 3a-c details relating to a further embodiment of corresponding catching elements or recesses.

DETAILED DESCRIPTION

FIG. 1 shows a door frame 1 for a door module to be placed in position or for a door covering, which cover the interior of the door frame over the entire surface and are liquid-impermeable.

Of concern hereby is a rear right side door of a four-door automotive vehicle. The upper side of the door with the window frame there is not represented. The region which is circled and designated with an arrow is intended to be described subsequently in more detail (see FIGS. 2a and 2b). The Cartesian coordinate system (X, Y, Z) illustrated in FIG. 1 is intended to serve for FIGS. 1, 2a and also 2b.

Figure 2A:
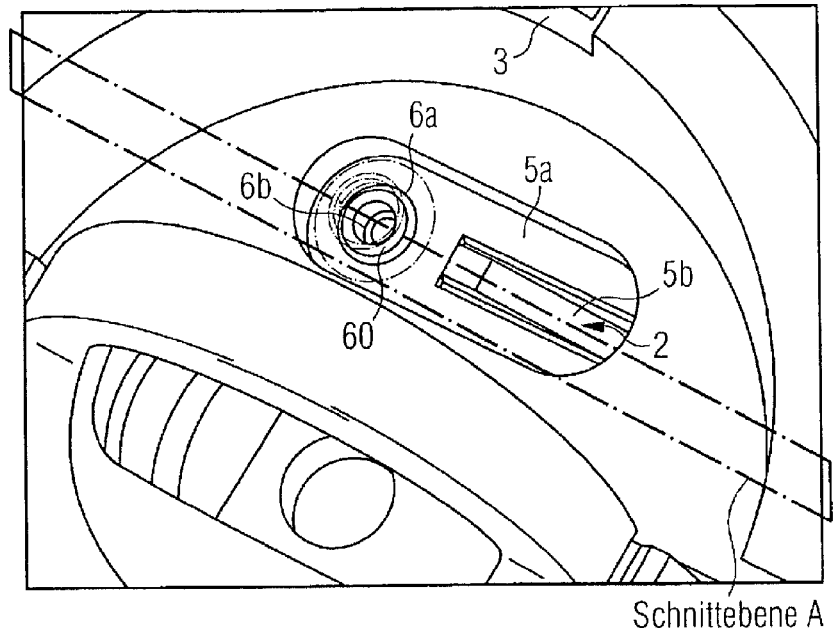

FIG. 2a shows a door covering 3 which sits on a door module 2 in the engaged state. The cut-out illustrated here as a circle corresponds essentially to the one circled in FIG. 1, of concern here is the periphery of a door handle 12.

A catching element 5a which is configured as an elastic element and has a recess 6a is shown. Said element is pushed onto the module in the negative Z-direction by pushing, the mentioned elastic element hereby runs up a ramp element which is configured as first catching element 5b until it snaps in the end position shown in FIG. 2a. In this end position, complementary recesses 6a and 6b are in engagement with each other. An attachment member 7 can be guided through the aligned opening of 6a and 6b (see in particular FIG. 2b to which reference is made subsequently). In this way, simple referencing of the door covering on the door module is achieved and the region around the door handle can be screwed directly in the centre to the door module.

Figure 2B:
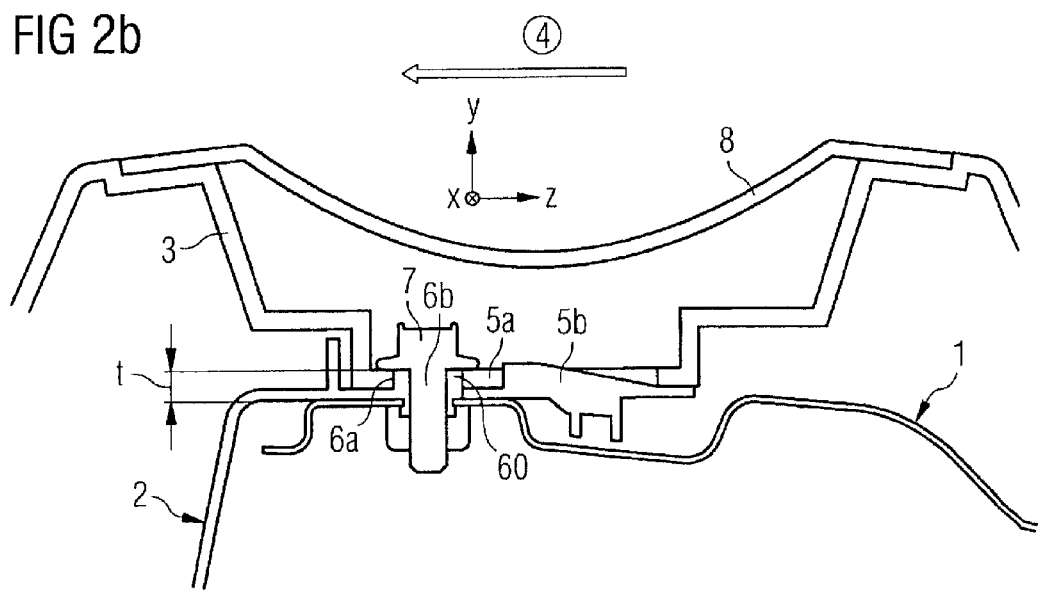

FIG. 2b shows a cross-section according to section plane A. A part of a door frame 1 can be seen here. The inner sheet of a door frame which is configured as a structural composite with inner and outer sheet can be seen concretely here. This door frame is manufactured preferably from a structural metal sheet. The door module 2 covers the opening of this door frame essentially over the entire surface. The door module is hereby manufactured from plastic material (polypropylene, with a long glass fibre supplement). A door covering 3 covers the door module 2 essentially over the entire surface. In the region of the attachment member 7, another door handle module 8 which can be fitted subsequently in the covering is shown in addition.

The engaged end state is shown in FIG. 2b. A first catching element 5a which belongs to the door covering 3 is hereby shown. By pushing in the direction of the arrow (i.e. negative Z-direction), this element is pushed over the second catching element 5b which is configured as a ramp and engages finally in the end state shown in FIG. 2b. The first recess 6a hereby concentrically surrounds the second recess 6b. The first recess 6a is hereby represented as a circular hole in the door covering. The second recess 6b is likewise a circular hole, said recess being provided in the region of a collar 60 of the door module, the outside of this collar 60 engaging in a form fit in the inner surface of the first recess 6a. The first recess 6a is hereby part of the first catching element 5a. In the state shown in FIG. 2b, the attachment member 7 is screwed in in addition. This is fixed on the rear side of the inner sheet of the door by a nut which is welded on there. It is utilised hereby that the corresponding recesses 6a and 6b in the engaged and aligned state (FIG. 2b) have a small total hole depth t than in the unengaged state.

Reference is made to FIG. 2b for the total hole depth t. In the unengaged state, the underside of the door covering which is shown in FIG. 2b is disposed for example at the highest step of the second catching element 5b or on the collar 60 of the second recess 6b. As a result, the total hole depth is significantly greater. This leads to the fact that the attachment member 7 with its thread cannot engage in the locknut. It is consequently ensured therefore that attachment is avoided in the non-optimum state.

It is therefore shown that the corresponding catching elements are configured as first (5a) and second (5b) catching element, at least one of these elements being an elastically rear-engaging element (presently 5a) which engages in a corresponding opening (for example the collar 60 around the second recess 6b).

An automotive vehicle door is therefore shown, containing a door frame 1, a door module for receiving function providers, such as loudspeakers, window lifting drives, control electronics, loudspeakers or the like, and also a door covering 3 for the aesthetic finish of the door towards the interior of the automotive vehicle, door covering 3 and door module 2 having corresponding catching elements (5a, 5b) for retaining door covering 3 and door module 2 in a predetermined arrangement relative to each other. The door module 2 and also the door covering 3 have corresponding recesses 6a, 6b which are disposed aligned relative to each other upon engagement of the above-mentioned catching elements 5a, 5b so that these form a through-opening. This through-opening serves for receiving an attachment member 7, as a result of which door module and also door covering can be connected to the door frame 1.

Figure 3C:
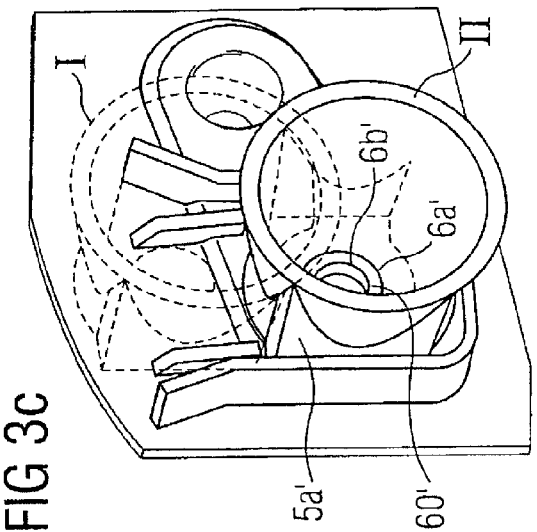
Figure 3B:
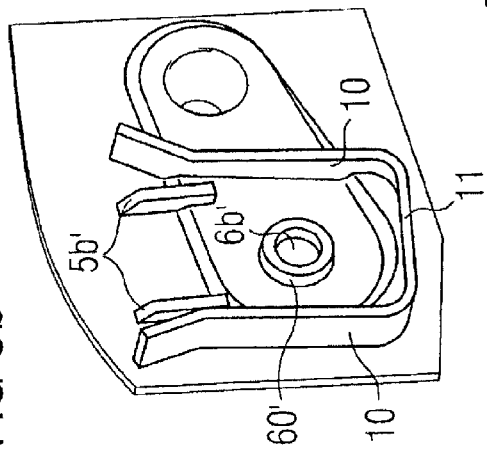
Figure 3A:
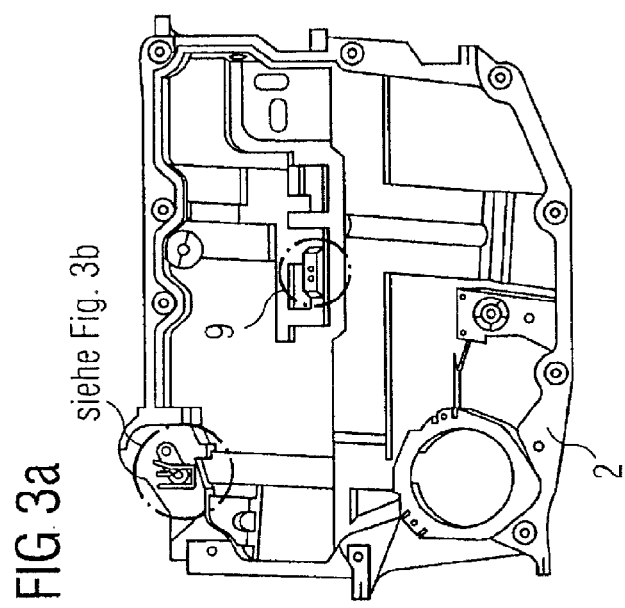

FIG. 3 shows details of a further embodiment. In FIG. 3a, a door module 2 is shown. A second connection place 9 which fixes the door covering in the region of the arm support mounting must hereby be emphasised, and in fact in the positive or negative Z-direction.

In FIG. 3b of the door module, the portion of the door module is shown, which has a recess for guiding through an attachment member 7. The guides 10 which are essentially "U"-shaped in plan view are hereby shown. The left or the right member of the U hereby serve as walls which guide a corresponding portion of the door covering in the negative Z-direction. The underside of the "U" hereby forms an end limit stop 11. There are shown as second catching elements protruding ramps or lugs 5b' which are disposed parallel to each other. Reference is made in addition in the region of these lugs to the fact that the upper members of the "U" are inclined slightly outwards, this serves as "guide- or run-in slope". The recess 6b' which has a collar 60' which protrudes beyond the adjacent surface of the module must be stressed here. The outer surface of this collar 60' is hereby configured such that the inner surface of the first recess 6a' engages herein in a form fit.

In FIG. 3c, a first catching element 5a' is shown, which has an essentially pot-shaped configuration and is a part of the door covering. This pot is pushed over the second catching elements 5b' from position I in the direction of the arrow and engages in position II shown in FIG. 3c so that the edge regions of the recesses 6a' and 6b' engage one in the other in a form fit in order thus to produce a minimum total hole depth here. Accordingly, an attachment member 7, for example a screw, can then be guided through and screwed securely to a door frame for the attachment.

What is claimed is:

1. An automotive vehicle door, comprising:
   a door frame;
   a door module receiving a function provider; and
   a door covering providing an aesthetic finish of the door towards an automotive vehicle interior,
   wherein the door covering and the door module have corresponding catching elements to retain the door covering and the door module in a predetermined arrangement relative to each other,
   wherein the door module and the door covering include corresponding recesses which are different from the catching elements and which are disposed and aligned relative to each other upon engagement of the catching elements for receiving an attachment member, the attachment member being connected to the door frame,
   wherein the attachment member is configured as one of a screw, a rivet and a nail,
   wherein the catching elements are displaceable for engagement essentially in a direction of a surface plane of the door module, and
   wherein the attachment member in an end assembly state is guided at least partially through the corresponding recesses and the corresponding catching elements.

2. The door of claim 1, wherein the function provider includes a loudspeaker.

3. The door of claim 1, wherein the door frame is configured as a structural composite with an inner sheet and an outer sheet.

4. The door of claim 1, wherein the door module is made of at least one of a plastic material and metal, the door module covering the interior of the door frame one of partially and essentially over the entire surface.

5. The door of claim 4, wherein the door module has an essentially plate-shaped configuration.

6. The door of claim 1, wherein the door covering covers at least one of the door module and the door frame over the entire surface.

7. The door of claim 1, wherein the corresponding recesses in an engaged and aligned state have a smaller total hole depth than in an unengaged state.

8. The door of claim 7, wherein the total hole depth in the engaged and aligned state of the catching elements is so small that the door covering and the door module can be fixed to the door frame using the attachment member.

9. The door of claim 1, wherein the corresponding recesses have edge regions which are complementary relative to each other and is inserted one in the other in a form fit.

10. The door of claim 1, wherein the corresponding catching elements are configured as first and second catching elements, at least one of the first and second catching elements being an elastically rear-engaging element which engages in a corresponding opening.

11. The door of claim 10, wherein the elastically rear-engaging element one of (a) contains a recess for guiding through the attachment member and (b) is disposed adjacently thereto.

12. The door of claim 1, wherein the catching elements are displaceable for engagement essentially in a direction perpendicular to the surface plane of the door module.

13. The door of claim 1, wherein the recesses in an engaged and aligned state are disposed in a region of a door handle.

14. The door of claim 1, wherein a door handle module is attached in a region of the engaged recesses which are provided with the attachment member.

15. The door of claim 1, wherein at least one further connection place is provided between the door covering and the door module.

16. The door of claim 1, further comprising:
guides guiding the catching elements relative to each other.

17. The door of claim 16, wherein the guides are configured as walls with an end limit stop which are perpendicular to the direction of guidance.

18. The door of claim 16, wherein the guides are configured as walls without an end limit stop which are perpendicular to the direction of guidance.

* * * * *